(12) United States Patent
Yoshikawa et al.

(10) Patent No.: US 11,228,220 B2
(45) Date of Patent: Jan. 18, 2022

(54) BUS-BAR UNIT AND MOTOR

(71) Applicant: Nidec Corporation, Kyoto (JP)

(72) Inventors: Masanori Yoshikawa, Kyoto (JP); Yusaku Yoshida, Kyoto (JP); Hideo Fujiwara, Kyoto (JP); Takashi Seguchi, Kyoto (JP); Kosuke Ogawa, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 159 days.

(21) Appl. No.: 16/636,046

(22) PCT Filed: Jul. 27, 2018

(86) PCT No.: PCT/JP2018/028249
§ 371 (c)(1),
(2) Date: Feb. 3, 2020

(87) PCT Pub. No.: WO2019/064877
PCT Pub. Date: Apr. 4, 2019

(65) Prior Publication Data
US 2021/0194310 A1 Jun. 24, 2021

(30) Foreign Application Priority Data
Sep. 29, 2017 (JP) .............................. JP2017-190055

(51) Int. Cl.
*H02K 3/52* (2006.01)
*B62D 5/04* (2006.01)

(52) U.S. Cl.
CPC ............... *H02K 3/522* (2013.01); *B62D 5/04* (2013.01); *H02K 2203/09* (2013.01)

(58) Field of Classification Search
CPC ............ H02K 3/50; H02K 3/38; H02K 3/522; H02K 2203/09
See application file for complete search history.

(56) References Cited

U.S. PATENT DOCUMENTS 3,675,058 A * 7/1972 Beddows ............... H02K 3/505
310/71
4,321,497 A * 3/1982 Long ........................ H02K 3/12
310/198

(Continued)

FOREIGN PATENT DOCUMENTS

JP 2017-046516 A 3/2017
WO 2014/057978 A1 4/2014

(Continued)

OTHER PUBLICATIONS

Official Communication issued in International Patent Application No. PCT/JP2018/028249, dated Oct. 2, 2018.

*Primary Examiner* — Robert W Horn
(74) *Attorney, Agent, or Firm* — Keating & Bennett

(57) ABSTRACT

A bus-bar unit includes bus-bars and a bus-bar holder supporting the bus-bars. Each bus-bar includes first and second bus-bar pieces. The first bus-bar piece includes a coil wire connection portion connected to a coil wire drawn from the stator and a first joint terminal joined to the second bus-bar piece. The second bus-bar piece includes an external connection terminal connected to an external apparatus and a second joint terminal joined to the first bus-bar piece. At least a portion of the first bus-bar pieces is embedded in the bus-bar holder. The first joint terminal includes a joint surface which faces and is joined to the second joint terminal and an opposite surface facing a side opposite to the joint surface. The joint surface and the opposite surface of the first joint terminal are exposed from the bus-bar holder.

10 Claims, 8 Drawing Sheets

(56) References Cited

U.S. PATENT DOCUMENTS

| | | | |
|---|---|---|---|
| 6,373,163 B1* | 4/2002 | Oohashi | H02K 3/50 |
| | | | 310/198 |
| 2017/0366060 A1 | 12/2017 | Haberkorn et al. | |
| 2019/0077440 A1 | 3/2019 | Yamashita et al. | |
| 2020/0343781 A1* | 10/2020 | An | F16B 43/00 |
| 2021/0050759 A1* | 2/2021 | Murakami | H02K 15/0068 |
| 2021/0091612 A1* | 3/2021 | Dameron | H02K 1/16 |
| 2021/0152044 A1* | 5/2021 | Yoshikawa | H02K 3/50 |
| 2021/0194310 A1* | 6/2021 | Yoshikawa | H02K 5/225 |

FOREIGN PATENT DOCUMENTS

| | | | | |
|---|---|---|---|---|
| WO | WO-2019064878 A1 * | 4/2019 | | H02K 3/50 |
| WO | WO-2021148451 A  * | 7/2021 | | H02K 3/52 |

\* cited by examiner

BUS-BAR UNIT AND MOTOR

CROSS REFERENCE TO RELATED APPLICATIONS

This is a U.S. national stage of PCT Application No. PCT/JP2018/028249, filed on Jul. 27, 2018, and priority under 35 U.S.C. § 119(a) and 35 U.S.C. § 365(b) is claimed from Japanese Application No. 2017-190055, filed Sep. 29, 2017; the entire disclosures of each application are hereby incorporated herein by reference.

FIELD OF THE INVENTION

The present disclosure relates to a bus-bar unit and a motor.

BACKGROUND

In the related art, a bus-bar unit is known. The bus-bar unit includes a plurality of bus-bars. The bus-bar includes a terminal (external connection terminal) which is connected to an external apparatus and a connection part (coil wire connection part) which is connected to a coil wire drawn from a stator.

A bus-bar provided in a bus-bar unit needs to be routed in a complicated shape between an external connection terminal and a coil wire connection part. Accordingly, in a case where the bus-bar is formed by press processing, it is difficult to increase the number of bus-bars obtained from a plate material, and thus, there has been a problem that a manufacturing cost increases.

As result of intensive studies, the inventors have obtained knowledge that a member having an external connection terminal and a member having a coil wire connection part are respectively formed and then joined with each other, and thus, it is possible to increase the number of the total bus-bars which are obtained. In this case, when a load such as vibration, and the like is applied to the bus-bar unit, there is a concern that a joint is damaged.

SUMMARY

According to an example embodiment of the present disclosure, there is provided a bus-bar unit provided on an upper side of a stator disposed annularly or substantially annularly around a central axis extending in an up-down direction, and the bus-bar unit includes a plurality of bus-bars, and a bus-bar holder that supports the bus-bars. Each of the bus-bars includes a first bus-bar piece and a second bus-bar piece. The first bus-bar piece includes a coil wire connection portion connected to a coil wire drawn from the stator and a first joint terminal joined to the second bus-bar piece. The second bus-bar piece includes an external connection terminal connected to an external apparatus and a second joint terminal joined to the first bus-bar piece. At least a portion of the first bus-bar pieces is embedded in the bus-bar holder. The first joint terminal includes a joint surface that faces and is joined to the second joint terminal and an opposite surface facing a side opposite to the joint surface. The joint surface and the opposite surface of the first joint terminal are exposed from the bus-bar holder.

According to another example embodiment of the present disclosure, a motor includes the bus-bar unit, the stator, and a rotor facing the stator via a gap in a radial direction.

The above and other elements, features, steps, characteristics and advantages of the present disclosure will become more apparent from the following detailed description of the example embodiments with reference to the attached drawings.

DETAILED DESCRIPTION

Hereinafter, motors according to example embodiments of the present disclosure will be described with reference to the drawings. Moreover, a scope of the present disclosure is not limited to the following example embodiments of the present disclosure, and may be arbitrarily modified within a scope of a technical idea of the present disclosure. Moreover, in the following drawings, a scale, the number, or the like of each structure may be different from those of an actual structure such that each configuration may be easily understood. In each drawing, a Z axis is appropriately shown. A Z axis direction in each drawing is a direction parallel to an axial direction of a central axis J shown in FIG. 1. In addition, in the following descriptions, a positive side (+Z side) in the Z axis direction is referred to as an "upper side", and a negative side (−Z side) in the Z axis direction is referred to as a "lower side". Moreover, the upper side and the lower side are directions used for explanation only, and do not limit an actual positional relationship or an actual direction. In addition, unless otherwise specified, a direction parallel to the central axis J (Z-axis direction) is simply referred to as an "axial direction" or an "up-down direction", a radial direction about the central axis J is simply referred to as a "radial direction", and a circumferential direction about the central axis J, that is, a direction around the central axis J is simply referred to as a "circumferential direction". Furthermore, in the following description, a "plan view" means a state viewed in the axial direction.

Figure 1:
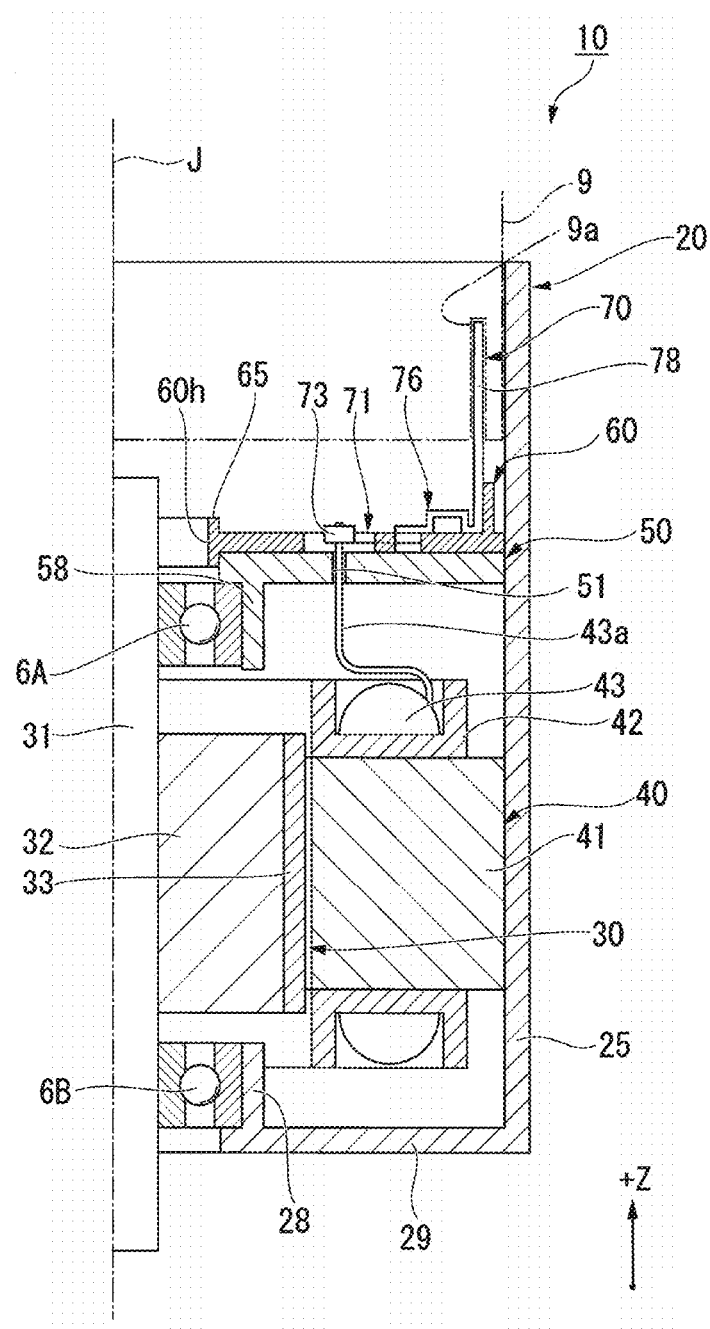
FIG. 1 is a cross-sectional view of a motor according to an example embodiment of the present disclosure.

FIG. 1 is a cross-sectional view of a motor 10 of the example embodiment of the present disclosure. The motor 10 of the example embodiment of the present disclosure includes a rotor 30, a stator 40, a housing 20, a bearing holder 50, an upper bearing 6A, a lower bearing 6B, and a bus-bar unit 60.

The rotor 30 rotates around a central axis J extending in an up-down direction. The rotor 30 includes a shaft 31, a rotor core 32, and a rotor magnet 33. The shaft 31 is disposed along the central axis J about the central axis J extending in the up-down direction (axial direction). The shaft 31 is rotatably supported around the central axis J by the upper bearing 6A and the lower bearing 6B. The rotor core 32 is fixed to an outer peripheral surface of the shaft 31. The rotor magnet 33 is fixed to an outer peripheral surface of the rotor core 32.

The stator 40 is disposed annularly or substantially annularly around the central axis J. The stator 40 surrounds an outer side of the radial direction of the rotor 30. The stator 40 faces the rotor 30 via a gap in the radial direction. The stator 40 includes an annular or substantially annular stator core 41, an insulator 42 which is mounted on the stator core 41, and a coil 43 which is mounted on the stator core 41 via the insulator 42. A coil 43 is defined by winding of the coil wire 43a. The coil wire 43a is wound around teeth of the stator core 41 via the insulator 42. An end part of the coil wire 43a is drawn upwardly and is connected to the bus-bar unit 60.

The housing 20 has a tubular or substantially tubular shape with opening on the upper side (+Z side). The housing 20 accommodates the rotor 30, the stator 40, the bearing holder 50, and the bus-bar unit 60. The housing 20 has a tubular part 25 and a bottom part 29.

The tubular part 25 surrounds the stator 40 from the outer side in the radial direction. In the example embodiment of the present disclosure, the tubular part 25 has a cylindrical or substantially cylindrical shape about the central axis J. The bottom part 29 is located at a lower end of the tubular part 25. A lower bearing holder 28 is provided at a center of the bottom part 29 in a plan view. The lower bearing holder 28 of the housing 20 holds the lower bearing 6B.

The bearing holder 50 is located on the upper side (+Z side) of the stator 40. In addition, the bearing holder 50 is located on the lower side of the bus-bar unit 60. That is, the bearing holder 50 is located between the stator 40 and the bus-bar unit 60 in the axial direction. For example, a shape of the bearing holder 50 in a plan view (XY plane view) is a circular or substantially circular shape which is concentric with the central axis J. The bearing holder 50 is held by the tubular part 25 of the housing 20 at an outer edge of the bearing holder 50. An upper bearing holder 58 is provided at a center of the bearing holder 50 in a plan view. The upper bearing holder 58 of bearing holder 50 holds the upper bearing 6A.

A first coil wire passage hole 51 penetrating the bearing holder 50 in the axial direction is provided in the bearing holder 50. The coil wire 43a drawn from the stator 40 passes through the first coil wire passage hole 51 and is drawn upwardly.

A shape of the bus-bar unit 60 in a plan view is a substantially circular shape widening in the radial direction. The bus-bar unit 60 is disposed on the upper side of the stator 40 and the bearing holder 50. For example, the bus-bar unit 60 is fixed to an upper surface of the bearing holder 50.

Figure 2:
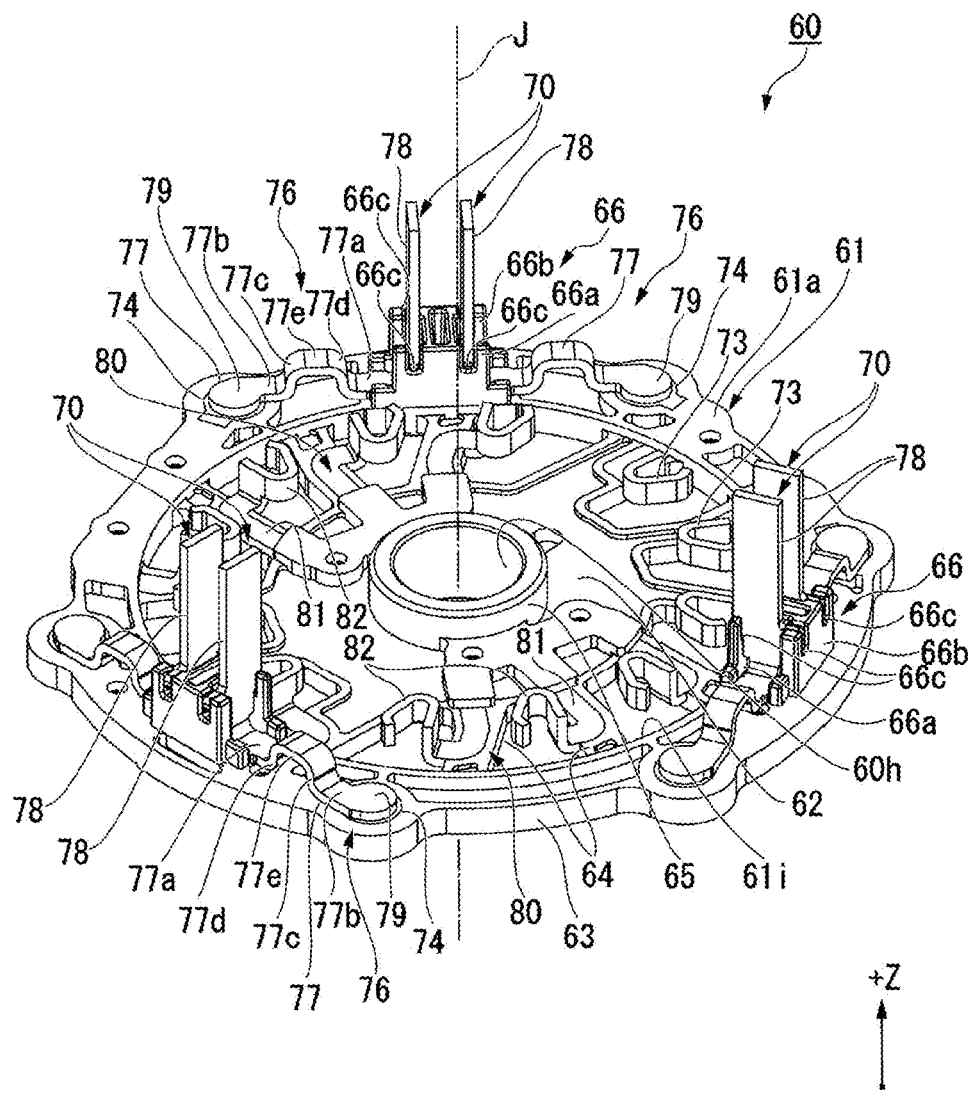
FIG. 2 is a perspective view of a bus-bar unit according to an example embodiment of the present disclosure.
Figure 3:
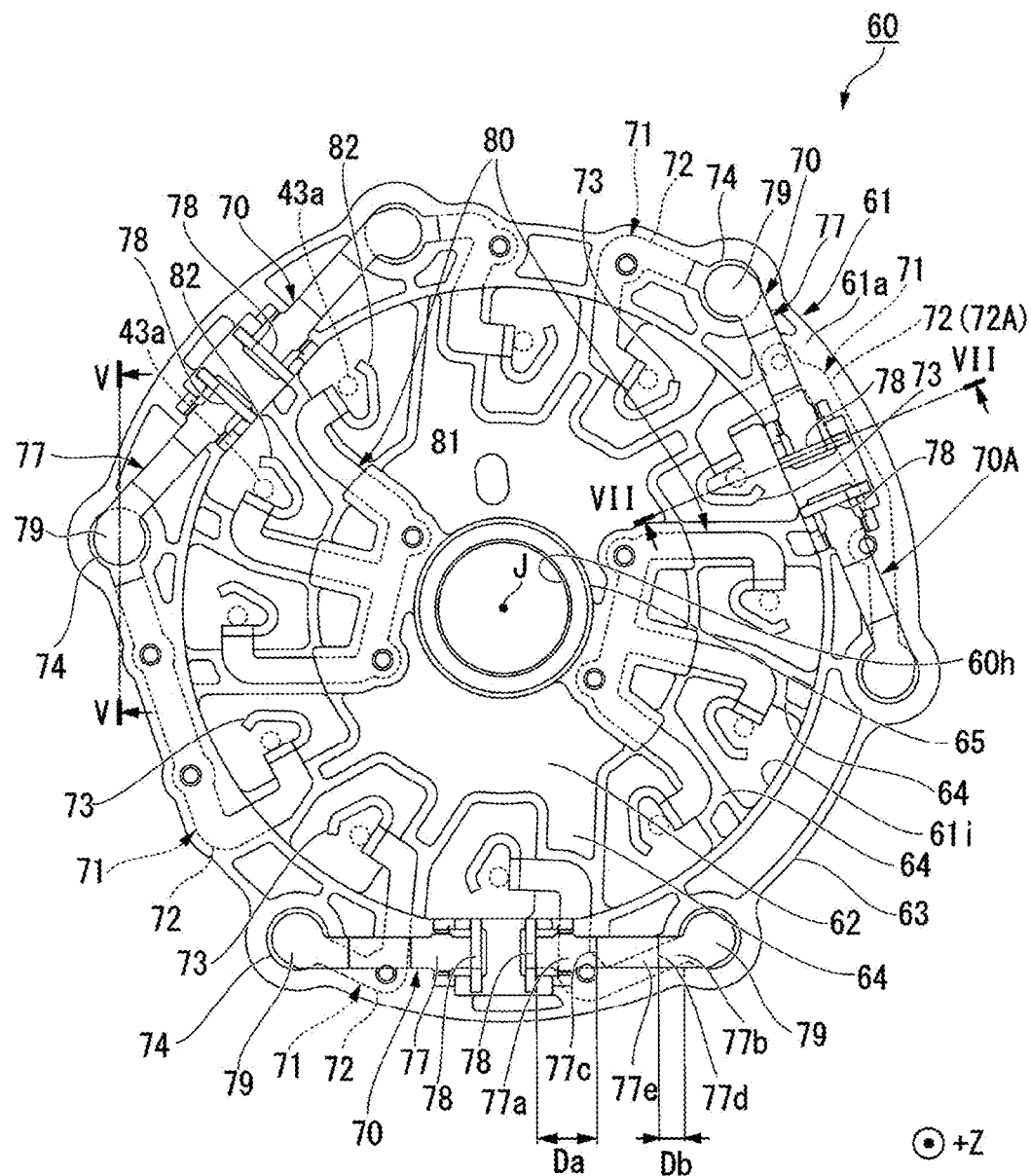
FIG. 3 is a plan view of a bus-bar unit of an example embodiment of the present disclosure.
Figure 4:
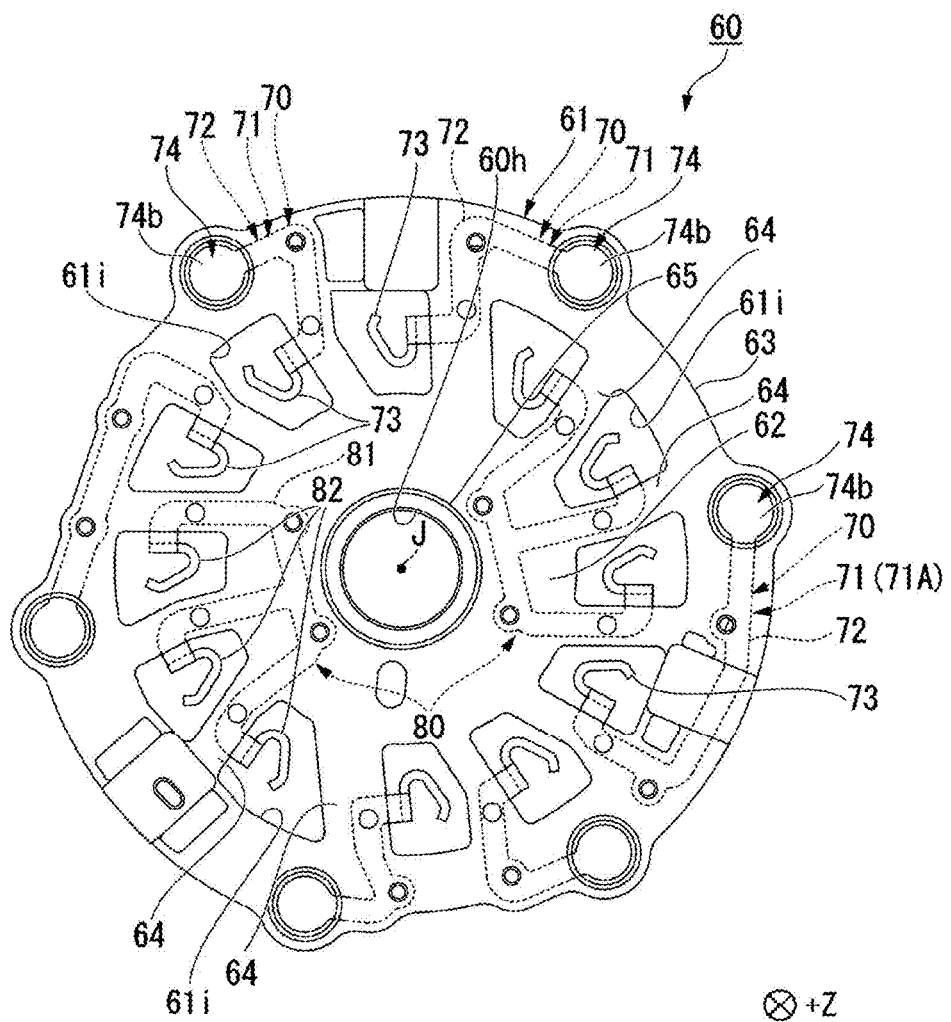
FIG. 4 is a bottom view of a bus-bar unit of an example embodiment of the present disclosure.
Figure 5:
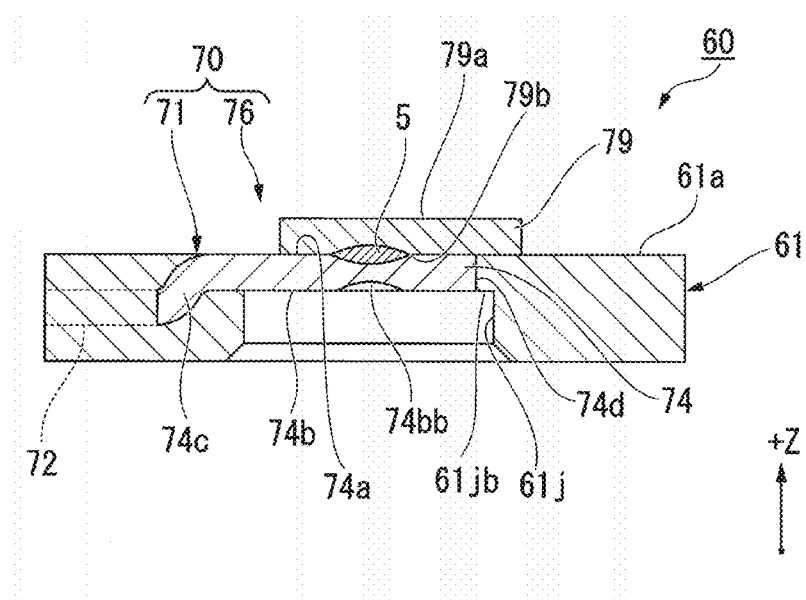
FIG. 5 is a cross-sectional view taken along line V-V shown in FIG. 3 and is a view showing a joint provided in the bus-bar unit.

FIG. 2 is a perspective view of the bus-bar unit 60. FIG. 3 is a plan view of the bus-bar unit 60. FIG. 4 is a bottom view of the bus-bar unit 60. FIG. 5 is a cross-sectional view of the bus-bar unit 60 taken along line V-V shown in FIG. 3.

As shown in FIG. 2, the bus-bar unit 60 includes a plurality of (six in the example embodiment of the present disclosure) phase bus-bars (bus-bar) 70, a plurality of (two in the example embodiment of the present disclosure) of neutral point bus-bars 80, and a bus-bar holder 61.

The bus-bar holder 61 supports the phase bus-bars 70 and the neutral point bus-bars 80. The bus-bar holder 61 extends in a plate or substantially plate shape along a direction orthogonal to the axial direction. A lower surface of the bus-bar holder 61 is in contact with the upper surface of the bearing holder 50. The bus-bar holder 61 is made of an insulating material, for example a resin, and the like.

The bus-bar holder 61 includes a disk plate 62 which is substantially circular in a plan view, an inner tube 65 which is located at a center of the disk plate 62 in a plan view, an annular or substantially annular ring 63 which surrounds the disk plate in a plan view, and a bridge part 64 which extends in the radial direction and connects the disk plate 62 and the ring 63 with each other.

A disk plate 62 is a disk which extends in the direction orthogonal to the central axis J about the central axis J. A part of neutral point bus-bars 80 is embedded in the disk plate 62. A shaft passage hole 60h is provided at a center of the disk plate 62 in a plan view. The shaft passage hole 60h is located at the center of the bus-bar holder 61 in a plan view. A shape of the shaft passage hole 60h in a plan view is circular or substantially circular about the central axis J. The shaft 31 passes through the shaft passage hole 60h (refer to FIG. 1).

The inner tube 65 is provided around the shaft passage hole 60h. The inner tube 65 is a cylinder or substantially cylinder which surrounds the shaft passage hole 60h about the central axis J. The inner tube 65 surrounds the shaft 31 from the outer side in the radial direction. The inner tube 65 extends vertically with respect to the disk plate 62.

The ring 63 extends annularly or substantially annularly along the circumferential direction. A part of phase bus-bars 70 is embedded in the ring 63. The ring 63 includes a terminal holder 66 which holds an external connection terminal 78 of the phase bus-bar 70 described later. That is, the bus-bar holder 61 includes the terminal holder 66.

The bridge part 64 extends in the radial direction. In the example embodiment of the present disclosure, 12 bridge parts 64 are provided in the bus-bar holder 61. A part of the phase bus-bars 70 is disposed on the upper side of six bridge parts 64 among the 12 bridge parts 64, and a part of the neutral point bus-bars 80 is disposed on the upper side of the other six bridge parts 64.

Second coil wire passage holes 61i penetrating the bridge parts 64 in the axial direction are provided between the bridge parts 64 arranged along the circumferential direction. A plurality of second coil wire passage holes 61i are provided along the circumferential direction. The coil wire 43a drawn from the coil 43 passes through the second coil wire passage hole 61i.

As described above, in the bus-bar holder 61, a part of the neutral point bus-bars 80 is embedded in the disk plate 62, and a part of the phase bus-bars 70 is embedded in the ring 63. That is, the bus-bar holder 61 is molded by embedding the neutral point bus-bars 80 and the phase bus-bars 70 and performing insert molding.

Each of the neutral point bus-bars 80 and the phase bus-bars 70 has a plate or substantial plate shape. Each of the neutral point bus-bar 80 and the phase bus-bar 70 is connected to the coil wire 43a extending from the stator 40. As shown in FIG. 1, the coil wire 43a is passed through the first coil wire passage hole 51 of the bearing holder 50 and the second coil wire passage hole 61i of the bus-bar holder 61, and is drawn upwardly from the bus-bar holder 61.

In the motor 10, a plurality of coils 43 are star-connected by the neutral point bus-bars 80 and the phase bus-bars so as to constitute a three-phase circuit. Moreover, the plurality of coils 43 may constitute a plurality of connection systems. Accordingly, even if a failure occurs in any of the connection systems, a current may be supplied to the motor 10. The plurality of connection systems are constituted by a three-phase circuit in which the coils 43 included in each of the connection systems are connected by star connection.

As shown in FIG. 3, one pair of neutral point bus-bars is disposed on sides opposite to each other in the radial direction with the central axis J being between the neutral point bus-bars. In the example embodiment of the present disclosure, one pair of neutral point bus-bars 80 has the same shape. One pair of neutral point bus-bars 80 is disposed point-symmetrically about the central axis J in a plan view.

The neutral point bus-bar 80 is made of a plate material. Each of the neutral point bus-bars 80 includes a bus-bar main body 81 and three coil wire connection parts 82.

The bus-bar main body 81 of the neutral point bus-bar 80 has an elongated plate or substantially elongated plate shape extending along a direction orthogonal to the axial direction. A plate surface of the bus-bar main body 81 is orthogonal to the up-down direction. The bus-bar main body 81 of the neutral point bus-bar 80 bus-bar is embedded in the disk plate 62 of the bus-bar holder 61. The bus-bar main body 81 is branched in three directions from both end parts in the circumferential direction and a central part in the circumferential direction, and protrudes into three second coil wire passage holes 61i.

The coil wire connection part 82 of the neutral point bus-bar 80 is located at a proximal end of branched points of the bus-bar main body 81. In addition, the coil wire connection part 82 is disposed at the inner side of the second coil wire passage hole 61i of the bus-bar holder 61. The coil wire connection part holds the coil wire 43a drawn from the stator 40 and is connected to the coil wire 43a by welding.

The phase bus-bar 70 includes a first bus-bar piece 71 and a second bus-bar piece 76. The first bus-bar piece 71 and the second bus-bar piece 76 are joined with each other and thereby are electrically connected to each other. The first bus-bar piece 71 and the second bus-bar piece 76 are made of different materials with each other.

In the phase bus-bar 70 of the example embodiment of the present disclosure, one first bus-bar piece 71 is joined to one second bus-bar piece 76. However, a phase bus-bar in which a plurality of first bus-bar pieces are joined to one second bus-bar piece may be employed.

As described above, the bus-bar unit 60 of the example embodiment of the present disclosure has six phase bus-bars. Accordingly, the bus-bar unit 60 of the example embodiment of the present disclosure has six first bus-bar pieces 71 and six second bus-bar pieces 76.

As shown in FIG. 3, the first bus-bar piece 71 is made of a plate material. At least a part of the first bus-bar pieces 71 is embedded in the bus-bar holder 61.

The first bus-bar piece 71 includes a first piece main body 72, a coil wire connection part 73, and a first joint terminal 74.

The first piece main body 72 has an elongated plate or substantially elongated plate shape extending along the direction orthogonal to the axial direction. The first piece main body 72 connects the coil wire connection part 73 and the first joint terminal 74. That is, the first bus-bar piece 71 has a first piece main body 72 which connects the coil wire connection part 73 and the first joint terminal 74. The first piece main body 72 is embedded in the ring 63 of the bus-bar holder 61. That is, the first bus-bar piece 71 is embedded in the bus-bar holder 61.

Here, attention is paid to one phase bus-bar 70A among the plurality of phase bus-bars 70. The phase bus-bar 70A of interest is a bus-bar disposed on the rightmost side in FIG. 3. The first piece main body 72A of the phase bus-bar 70A overlaps the external connection terminal 78 when viewed in the axial direction. That is, the first piece main body 72A of at least some of the plurality of bus-bars overlaps with the external connection terminal 78 when viewed in the axial direction.

According to the example embodiment of the present disclosure, it is possible to increase a degree of freedom in disposition of the phase bus-bar 70A by disposing the external connection terminal 78 and the first piece main body 72A in the axial direction and thereby overlapping each other in the axial direction. As a result, it is possible to decrease radial dimensions of the bus-bar unit 60. In addition, this disposition may become possible because a part of the bus-bar holders 61 is interposed between the first piece main body 72A and the external connection terminal 78 in the axial direction and the first piece main body 72A and the external connection terminal 78 are insulated from each other. In the example embodiment of the present disclosure, the first piece main body 72A is embedded in the bus-bar holder 61, and thus, the first piece main body 72A and the external connection terminal 78 are insulated from each other.

The coil wire connection part 73 is located at one end of the first piece main body 72. The coil wire connection part 73 is exposed from the bus-bar holder 61. The coil wire connection part 82 is disposed at the inner side of the second coil wire passage hole 61i of the bus-bar holder 61. The coil wire connection part 73 holds the coil wire 43a and is connected to the coil wire 43a by welding.

The first joint terminal 74 is located at an end part (the other end) of the first piece main body 72 opposite to the coil wire connection part 73. The first joint terminal 74 is joined to the second bus-bar piece 76. The first joint terminal 74 is circular or substantially circular when viewed in the axial direction.

As shown in FIG. 5, the first joint terminal 74 has an upper surface (a first joint surface (a joint surface)) 74a directed towards the upper side, a lower surface (an opposite surface) 74b directed towards the opposite side of the upper surface 74a (that is, directed towards the lower side), and an outer peripheral surface 74d which connects the upper surface 74a and the lower surface 74b. That is, the joint surface is directed towards the upper direction. Each of the upper surface 74a and the lower surface 74b of the first joint terminal 74 has a circular or substantially circular shape. As will be described later, the upper surface 74a of the first joint terminal 74 is joined to a lower surface 79b of a second joint terminal 79 of the second bus-bar piece 76.

The first joint terminal 74 has a bent part 74c at a boundary between the first piece main body 72 and the first joint terminal 74. The bent part 74c is bent in a crank or substantially crank shape so that the first joint terminal 74 is offset upwardly with respect to the first piece main body 72. Accordingly, a position of the upper surface 74a of the first joint terminal 74 in the axial direction coincides with a position of the upper surface 61a of the bus-bar holder 61 in the axial direction, and the upper surface 74a of the first joint terminal 74 is exposed from the bus-bar holder 61.

A concavity 61j which is open downwardly from the lower surface 74b of the first joint terminal 74 is provided in the bus-bar holder 61. A position of the lower surface 74b of the first joint terminal 74 in the axial direction coincides with a position of a bottom surface 61jb directed towards the lower side of the concavity 61j in the axial direction. Accordingly, the lower surface 74b of the first joint terminal 74 is exposed from the bus-bar holder 61.

According to the example embodiment of the present disclosure, the first bus-bar piece 71 having the first joint terminal 74 is embedded in the bus-bar holder 61. Thereby, even if the first bus-bar piece 71 is firmly held in the bus-bar holder 61, and thus, even when a vibration occurs in the bus-bar unit 60, the vibration is hardly amplified in the first joint terminal 74. As a result, it is possible to prevent the joints 5 and 105 of the first joint terminal 74 and the second joint terminal 79 from being damaged by the vibration. Moreover, since the first bus-bar piece 71 is exposed from the bus-bar holder 61 on the upper surface 74a and the lower surface 74b of the first joint terminal 74, the bus-bar holder 61 does not hinder a joining process described later, and it is possible to simplify the joining process.

In the example embodiment of the present disclosure, the outer peripheral surface 74d of the first joint terminal 74 is embedded in the bus-bar holder 61. That is, the first joint terminal 74 is embedded in the bus-bar holder 61 in the outer peripheral surface 74d. Thereby, stability in holding the first joint terminal 74 by the bus-bar holder 61 is improved, and it is possible to effectively restrain damages to the joints 5 and 105 during vibration or the like. In addition, as the stability in holding the first joint terminal 74 by the bus-bar holder 61 gets to be improved, it is possible to stably perform the joining process between the first joint terminal 74 and the second joint terminal 79.

In the example embodiment of the present disclosure, the entire periphery of the first joint terminal 74 surrounds the bus-bar holder 61 when viewed in the axial direction. That is, the entire periphery of the outer peripheral surface 74d of the first joint terminal 74 is embedded in the bus-bar holder 61. Accordingly, the stability in holding the first joint terminal 74 by the bus-bar holder 61 is further improved.

As shown in FIG. 2, the second bus-bar piece 76 is made of a plate material. The second bus-bar piece 76 is located on the upper side of the ring 63 of the bus-bar holder 61. As described above, while the first bus-bar piece 71 is embedded inside the bus-bar holder 61, a second piece main body 77 is located outside the bus-bar holder 61.

As shown in FIG. 3, the second bus-bar piece 76 includes the second piece main body 77, the external connection terminal 78, and the second joint terminal 79.

The second joint terminal 79 is located at one end of the first piece main body 72. The second joint terminal 79 is joined to the first bus-bar piece 71. The second joint terminal 79 is circular or substantially circular when viewed in the axial direction. The second joint terminal 79 is located on the upper side of the first joint terminal 74. When viewed in the axial direction, the second joint terminal 79 overlaps the first joint terminal 74.

FIG. 5 is a cross-sectional view showing the joint 5 between the first joint terminal 74 and the second joint terminal 79 which are joined by welding. As shown in FIG. 5, the second joint terminal 79 includes an upper surface 79a directed towards the upper side, and a lower surface (a second joint surface) 79b directed towards the opposite side of the upper surface 79a, that is, the lower direction. The lower surface 79b of the second joint terminal 79 faces and is in contact with the upper surface 74a of the first joint terminal 74 in the axial direction.

In the example embodiment of the present disclosure, the first joint terminal 74 and the second joint terminal 79 are joined with each other by welding. More specifically, the first joint terminal 74 and the second joint terminal 79 are joined by projection welding. The protrusion (projection) welding is a type of resistance welding. A projection is formed on the upper surface 74a of the first joint terminal 74 prior to projection welding by press processing. Moreover, a concavity for forming the protrusion is provided on the lower surface 74b of the first joint terminal 74. In this state, the first joint terminal 74 and the second joint terminal 79 overlap each other in the up-down direction and are energized while being pressed from above and below. Accordingly, resistance heating is concentrated in the protrusion and thereby the protrusion is melted, and thus, a weld zone 6 is provided. That is, the weld zone 6 is provided between the upper surface 74a of the first joint terminal 74 and the lower surface 79b of the second joint terminal 79. Moreover, the lower surface 74b of the first joint terminal 74 after providing the weld zone 6 becomes to be in a state in which a concavity mark 74bb which is a concavity mark is provided.

Moreover, in the example embodiment of the present disclosure, a case where the concavity mark 74bb is provided in the lower surface 74b of the first joint terminal 74 is described. However, in a case where a protrusion (projection) is provided in the second joint terminal 79, the concavity mark 74bb is provided on the upper surface 79a of the second joint terminal 79.

Figure 6:
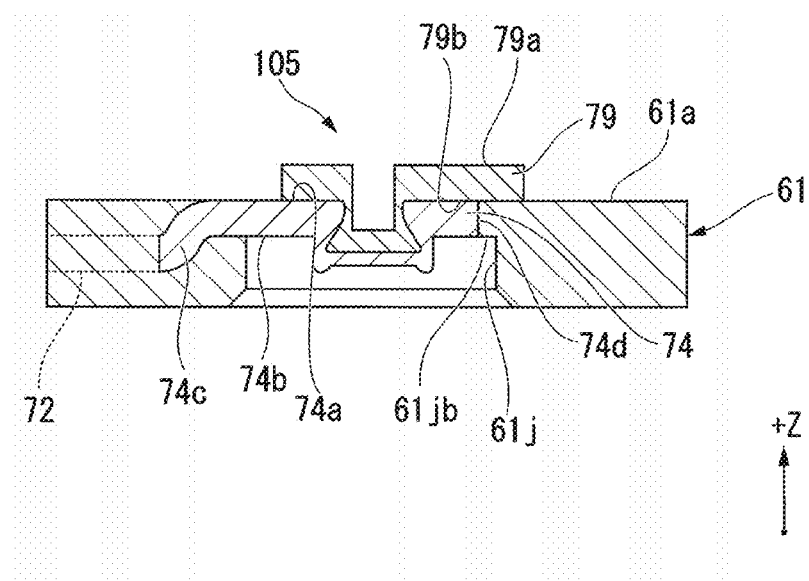
FIG. 6 is a cross-sectional view of a joint of a modification example corresponding to FIG. 5.

The first joint terminal 74 and the second joint terminal 79 may be press-joined. As an example of the press joining, a case where the first joint terminal 74 and the second joint terminal 79 are joined with each other by TOX (a registered trademark) joining is described as a modification example. FIG. 6 is a cross-sectional view showing the joint 105 between the first joint terminal 74 and the second joint terminal 79 which are press-joined with each other. In the TOX joining, a press processing is performed in a state where the first joint terminal 74 and the second joint terminal 79 overlap each other, which is that the first joint terminal 74 and the second joint terminal 74 are press-fitted between an upper die having a cylinder or substantially cylinder convexity and a lower die having a concavity. The first joint terminal 74 and the second joint terminal 79 are plastically deformed and thereby joined with each other by the press processing as described above.

According to the example embodiment of the present disclosure and the modification example thereof, the first joint terminal 74 and the second joint terminal 79 are welded with each other by weld joining (FIG. 5) or press joining (FIG. 6). The weld joining and the press joining are joining methods which are capable of local joining having high joining strength possible. Also, the weld joining and press joining are joining methods which are relatively inexpensive processes, and make it possible to join the first joint terminal 74 and the second joint terminal 79 with each other, which are metal materials. That is, according to the example embodiment of the present disclosure and the modification example thereof, by employing the weld joining or press joining, the first joint terminal 74 and the second joint terminal 79 may be joined with each other with high strength by an inexpensive manufacturing process.

As shown in FIGS. 5 and 6, the upper surface 74a and the lower surface 74b of the first joint terminal 74 are exposed from the bus-bar holder 61. Accordingly, it is possible to join the first joint terminal 74 and the second joint terminal 79 with each other by weld joining or press joining.

In the example embodiment of the present disclosure, the first joint terminal 74 and the second joint terminal 79 overlap with each other in the axial direction. However, for example, the first joint terminal 74 and the second joint terminal 79 may overlap with each other in the other direction such as the radial direction. In this case, the joint surface of the first joint terminal 74 and the second joint terminal 79 is directed in the other direction such as the radial direction. Moreover, in a case where the first joint terminal 74 and the second joint terminal 79 overlap with each other in the axial direction, an electrode (or a die of press joining) of the resistance welding may be pressed against the first joint terminal 74 and the second joint terminal 79 in the up-down direction, and thus, it is possible to simplify a manufacturing apparatus.

In the bus-bar unit 60 of the example embodiment of the present disclosure, the plurality of first joint terminals 74 are disposed on the same virtual circle about the central axis J when viewed in the axial direction. In other words, the distances between the plurality of first joint terminals 74 and the central axis J are the same as each other when viewed in the axial direction. Accordingly, in the joining process of the first joint terminal 74 and the second joint terminal 79, by rotating the bus-bar unit 60 around the central axis J, each of the plurality of first joint terminals 74 may be joined to the second joint terminals 79 without moving the electrode (or the die of the press joining) of the resistance welding in the radial direction, and thus, it is possible to simplify the joining process. Moreover, the second joint terminal 79 is disposed on the upper side of each of the plurality of first joint terminals 74. For this reason, the plurality of second joint terminals 79 are also disposed on the same virtual circle about the central axis J when viewed in the axial direction.

As shown in FIG. 3, the external connection terminal 78 is located at the end part (the other end) opposite to the second joint terminal 79 of the second piece main body 77. As shown in FIG. 1, the external connection terminal 78 is connected to an external apparatus 9 for supplying electric power to the motor 10. The external connection terminal 78 extends upwardly with respect to the bus-bar holder 61.

The external connection terminal 78 is held in the terminal holder 66 of the bus-bar holder 61. Moreover, as described above, the second joint terminal 79 is joined to the first joint terminal 74. That is, both ends of the second bus-bar piece 76 in a length direction are held. For this reason, stability of the second bus-bar piece 76 gets improved, and it is possible to prevent the second bus-bar piece 76 from being detached from the bus-bar unit 60 even when a vibration is applied to the motor 10.

Six external connection terminals 78 are provided in the bus-bar unit 60. With one pair of external connection terminals 78 being a set, each set of six external connection terminals 78 is held in three terminal holders 66. One pair of terminal holders 66 of each set held in three terminal holders 66 is disposed in the rotationally symmetrical manner about the central axis J. The external connection terminal 78 is disposed with a direction orthogonal to the axial direction as a plate thickness direction. One pair of external connection terminals 78 held in one terminal holder 66 is disposed by coinciding the plate thickness directions.

As shown in FIG. 2, the terminal holder 66 has a first wall (a wall part) 66a and a second wall (a wall part) 66b. Each of the first wall 66a and the second wall 66b protrudes upwardly along an end part of the external connection terminal 78 in the width direction. Moreover, the first wall 66a and the second wall 66b extend in the direction orthogonal to the radial direction. The first wall 66a and the second wall 66b are arranged in the radial direction. The first wall 66a is disposed on the inner side of the second wall 66b in the radial direction.

One pair of notches 66c is provided in the first wall 66a and the second wall 66b, respectively. One pair of notches 66c is open upwardly. One pair of notches 66c of the first wall 66a and the other one pair of notches 66c of the second wall 66b overlap with each other when viewed in the radial direction. One external connection terminal 78 is inserted into the notch 66c of the first wall 66a and the notch 66c of the second wall 66b which overlap with each other when viewed in the radial direction. That is, according to the example embodiment of the present disclosure, the terminal holder 66 sandwiches the external connection terminal from the plate thickness direction and thereby holds the external connection terminal 78. Accordingly, it is possible to easily prevent the external connection terminal 78 from being detached in the plate thickness direction. Moreover, since the notch 66c is open upwardly, the external connection terminal 78 is inserted into the notch 66c from the upper side, and thus, it is possible to easily mount the external connection terminal 78 onto the bus-bar holder 61.

Figure 7:
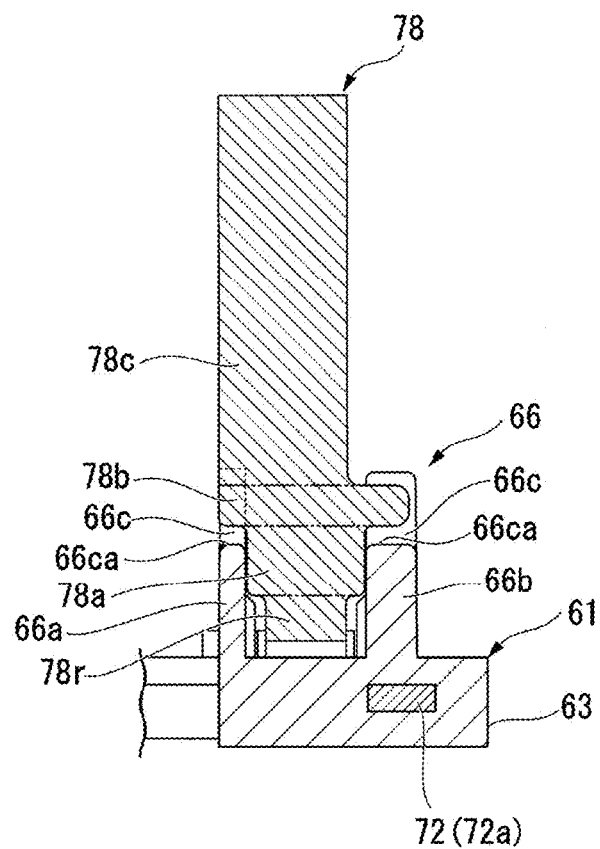
FIG. 7 is a cross-sectional view taken along line VII-VII of FIG. 3.

FIG. 7 is a cross-sectional view taken along line VII-VII of FIG. 3. The external connection terminal 78 includes a root part 78r, a first part 78a, a second part 78b, and a third part 78c. The root part 78r, the first part 78a, the second part 78b, and the third part 78c are arranged in this order from the lower sider to the upper side. A boundary line between the root part 78r and the first part 78a, a boundary line between the first part 78a and the second part 78b, and a boundary line between the second part 78b and the third part 78c extend in the plate width direction of the external connection terminal 78, respectively.

Each of the plate widths of the root part 78r, the first part 78a, the second part 78b, and the third part 78c is different from each other. In the external connection terminal 78, the plate width increases in the order of the root part 78r, the first part 78a, the third part 78c, and the second part 78b. In addition, in the external connection terminal 78, the dimension in the axial direction increases in the order of the second part 78b, the root part 78r, the first part 78a, and the third part 78c.

The root part 78r is located at a lower end part of the external connection terminal 78. In the external connection terminal 78, the root part 78r has the narrowest plate width. The lower end of the root part 78r is curved towards the second piece main body 77.

The first part 78a is located on the upper side of the root part 78r. The first part 78a protrudes to both sides in the width direction with respect to the root part 78r. Therefore, the first part 78a has a plate width larger than that of the root part 78r.

The second part 78b is located on the upper side of the first part 78a. The second part 78b protrudes to both sides in the width direction with respect to the first part 78a. Therefore, the second part 78b has a plate width larger than that of the first part 78a. In the external connection terminal 78, the second part 78b has the largest plate width.

The third part 78c is located on the upper side of the second part 78b. The third part 78c is recessed on both sides in the width direction with respect to the second part 78b. The third part 78c has a plate width smaller than that of the second part 78b. As shown in FIG. 1, the third part 78c of the external connection terminal 78 is inserted into a socket 9a of the external apparatus 9.

The first wall 66a and the second wall 66b of the terminal holder 66 are disposed on both sides of the root part 78r and the first part 78a in the width direction. That is, the root part 78r and the first part 78a are interposed between the first wall 66a and the second wall 66b from both sides in the width direction. Accordingly, a movement of the external connection terminal 78 along the width direction is suppressed by the terminal holder 66.

The second part 78b of the external connection terminal 78 is inserted into the notch 66c of the terminal holder 66 and is held. That is, the second part 78b is inserted into the notch 66c. A bottom surface 66ca directed towards the upper side is provided in the notch 66c. A gap is provided between the bottom surface 66ca and the second part 78b. Accordingly, the notch 66c does not restrict a movement of the external connection terminal 78 towards the lower side while holding the external connection terminal 78. Stress applied to the external connection terminal 78 when the external connection terminal 78 is inserted into the socket 9a of the external apparatus 9 may be released to the second piece main body 77 via the curved root part 78r. Accordingly, since the terminal holder 66 does not receive stress when the external connection terminal 78 is inserted into the socket 9a, the terminal holder 66 may have a simple structure. Moreover, the stress released to the second piece main body 77 is absorbed by cranks 77c and 77d described later, and is restrained from being transmitted to the second joint terminal 79.

The second piece main body 77 has an elongated plate or substantially elongated plate shape extending linearly along the circumferential direction when viewed in the axial direction. The second piece main body 77 connects the external connection terminal 78 and the second joint terminal 79.

As shown in FIG. 2, the second piece main body 77 includes a first extension 77a, a second extension 77b, one pair of cranks 77c and 77d, and an intermediate part 77e which is located between one pair of cranks 77c and 77d.

The first extension 77a extends along the direction orthogonal to the axial direction. In addition, the first extension 77a is connected to the external connection terminal 78 and extends linearly from the external connection terminal 78 towards the second joint terminal 79. The first extension 77a is disposed with the axial direction being as a plate thickness direction.

The second extension 77b extends along the direction orthogonal to the axial direction. In addition, the second extension 77b is connected to the second joint terminal 79 and extends linearly from the second joint terminal 79 towards the external connection terminal 78. The second extension 77b is disposed with the axial direction being as a plate thickness direction. In the example embodiment of the present disclosure, a position of the second extension 77b in the axial direction coincides with a position of the first extension 77a in the axial direction.

The cranks 77c and 77d are located between the first extension 77a and the second extension 77b, respectively. The cranks 77c and 77d are bent along a plate thickness direction. Also, the cranks 77c and 77d are bent upwardly in a crank or substantially crank shape. More specifically, the cranks 77c and 77d include a part which is connected to the first extension 77a or the second extension 77b and is bent so as to rise in the axial direction from a horizontal direction, a part which extends along the axial direction, and a part which is bent in the horizontal direction from the axial direction at an upper end of the part extending along the axial direction and is connected to the intermediate part 77e.

The intermediate part 77e connects one pair of cranks 77c and 77d. The intermediate part 77e extends along the direction orthogonal to the axial direction. The intermediate part 77e is disposed to be shifted from the first extension 77a and the second extension 77b in the axial direction. In the example embodiment of the present disclosure, the intermediate part 77e is located on the upper side of the first extension 77a and the second extension 77b. However, the intermediate part 77e may be located on the lower side of the first extension 77a and the second extension 77b. In this case, one pair of cranks 77c and 77d is bent in a crank or substantially crank shape towards the lower side.

As shown in FIG. 1, when the external connection terminal 78 is inserted into or removed from the socket 9a of the external apparatus 9, stress may be transmitted to the second piece main body 77 due to rattling, or the like of the external connection terminal 78. If this stress is transmitted to the second joint terminal 79, there is a concern that the joints 5 and 105 between the first joint terminal 74 and the second joint terminal 79 may be damaged. According to the example embodiment of the present disclosure, the cranks 77c and 77d which are bent in a crank or substantially crank shape in the plate thickness direction are provided between the first extension 77a and the second extension 77b. Accordingly, the stress transmitted from the external connection terminal 78 to the second piece main body 77 may be absorbed by elastic deformation of the cranks 77c and 77d. As a result, it is possible to prevent the stress from being transmitted to the second joint terminal 79, and to prevent the joints 5 and 105 between the first joint terminal 74 and the second joint terminal 79 from being damaged.

Moreover, in the example embodiment of the present disclosure, two cranks 77c are provided between the first extension 77a and the second extension 77b. Accordingly, an effect of reducing the stress transmitted to the second joint terminal 79 may be enhanced. However, even in a case where one crank 77c is provided between the first extension 77a and the second extension 77b, a certain effect of stress reduction as described above may be obtained. Moreover, according to the example embodiment of the present disclosure, by providing two cranks 77c, it is possible to coincide the axial position of the first extension 77a with the axial position of the second extension 77b.

As shown in FIG. 3, in the example embodiment of the present disclosure, a length dimension of the first extension 77a in a longitudinal direction is larger than a length dimension of the second extension 77b in a longitudinal direction. That is, the distance Da from the external connection terminal 78 to the crank 77d is longer than the distance Db from the second joint terminal 79 to the crank 77c. Accordingly, by disposing the external connection terminal 78 and the crank 77d apart as far as possible, it is possible to enhance an effect of stress absorption in the crank 77d.

Moreover, in the example embodiment of the present disclosure, each of the first extension 77a and the second extension 77b is disposed with the axial direction being as the plate thickness direction. However, the first extension 77a and the second extension 77b may be disposed with the direction orthogonal to the axial direction being as the plate thickness direction. In this case, the crank 77c is bent in the plate thickness direction orthogonal to the axial direction.

In the example embodiment of the present disclosure, both the first bus-bar piece 71 and the second bus-bar piece 76 are made of a plate material and molded by press processing. In the example embodiment of the present disclosure, the phase bus-bars 70 are branched into the first bus-bar piece 71 and the second bus-bar piece 76. Accordingly, even in a case where the phase bus-bar 70 has a complicated shape, it is possible to increase the number of bus-bars 70 obtained from the plate material and thereby increase a yield.

According to the example embodiment of the present disclosure, the first bus-bar piece 71 having the coil wire connection part 73 and the second bus-bar piece 76 having the external connection terminal 78 are made of different materials with each other. In the example embodiment of the present disclosure, material characteristics required for the external connection terminal 78 and the coil wire connection part 73 are different from each other. The external connection terminal 78 is molded to be long in the axial direction in order to be connected to the external apparatus 9. Therefore, it is preferable that the external connection terminal 78 is made of a highly rigid material. Meanwhile, the coil wire connection part 73 is molded into a complicated shape, and thus, it is preferable that the coil wire connection part 73 is made of a low-rigidity material such that punching stress and bending stress due to the press are reduced. That is, it is preferable that a material constituting the second bus-bar piece 76 has rigidity higher than that of a material constituting the first bus-bar piece 71.

In addition, since the material characteristics of any one of the external connection terminal 78 and the coil wire connection part 73 out of the material characteristics required for the external connection terminal 78 and the coil wire connection part 73 are emphasized, it may be necessary to use an expensive material for the phase bus-bars 70 as a whole. According to the example embodiment of the present disclosure, the phase bus-bars 70 are divided into the first bus-bar piece 71 and the second bus-bar piece 76. Accordingly, it is possible to inexpensively manufacture the phase bus-bars 70 as a whole while satisfying the material characteristics required for each part.

Figure 8:
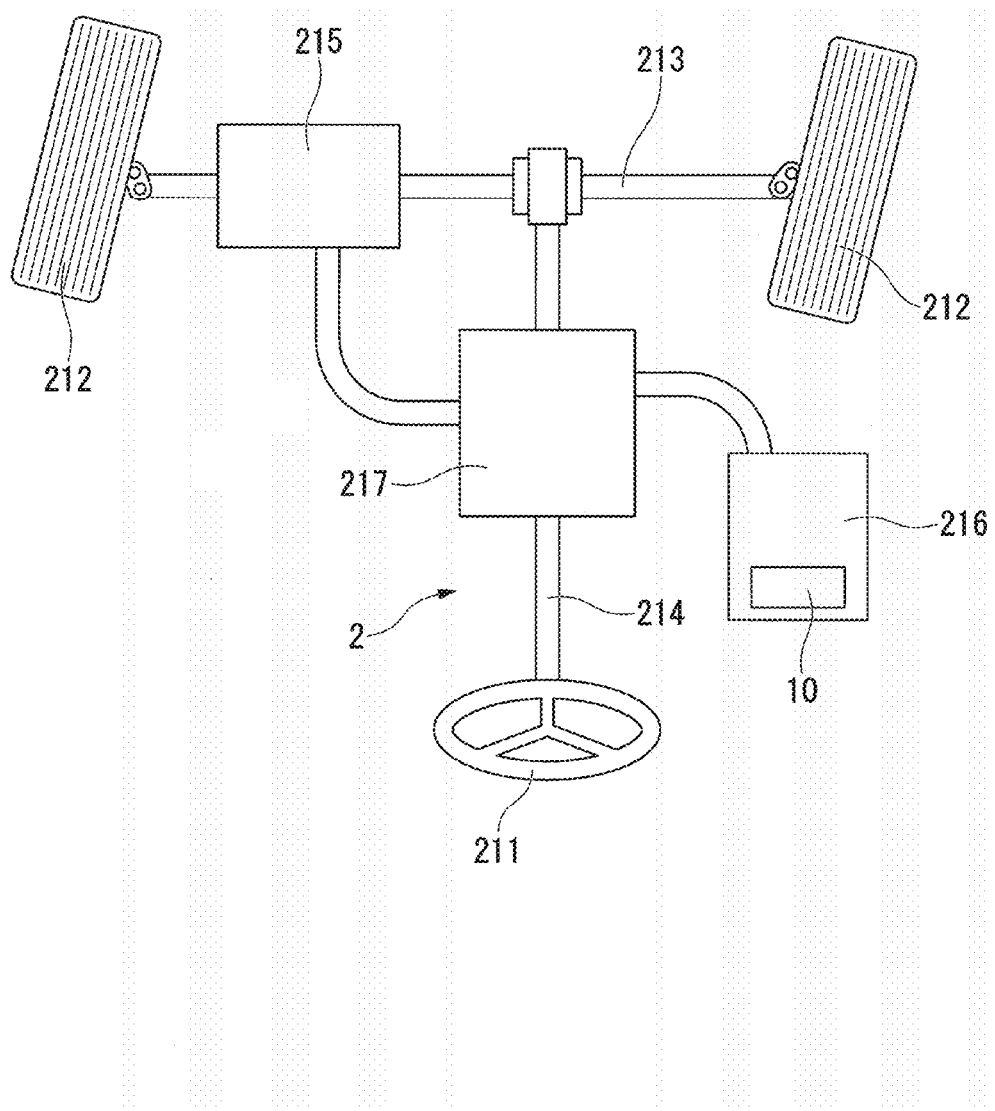
FIG. 8 is a schematic view of an electric power steering apparatus according to an example embodiment of the present disclosure.

Next, an apparatus of an example embodiment of the present disclosure on which the motor 10 of the example embodiment of the present disclosure is mounted will be described. FIG. 8 is a schematic view of an electric power steering apparatus 2 on which the motor 10 of the example embodiment of the present disclosure is mounted. The electric power steering apparatus 2 is mounted on a steering mechanism of a wheel 212 of an automobile. The electric power steering apparatus 2 is an apparatus which reduces a steering force by a hydraulic pressure. The electric power steering apparatus 2 includes a motor 10, a steering shaft 214, an oil pump 216, and a control valve 217.

The steering shaft 214 transmits the input from a steering 211 to an axle 213 having the wheels 212. The oil pump 216 generates hydraulic pressure in a power cylinder 215 which transmits a hydraulic driving force to the axle 213. The control valve 217 controls oil of the oil pump 216. In the electric power steering apparatus 2, the motor 10 is mounted as a drive source for the oil pump 216. Moreover, the motor 10 of the example embodiment of the present disclosure is not limited to the electric power steering apparatus 2, and may be mounted on any apparatus.

For example, in the above-described example embodiment, the case where the bus-bar unit 60 is disposed on the upper side of the bearing holder 50 is described. However, the bus-bar unit 60 may be disposed between the bearing holder 50 and the stator 40 in the axial direction.

Features of the above-described example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A bus-bar unit on an upper side of a stator disposed annularly or substantially annularly around a central axis extending in an up-down direction, the bus-bar unit comprising:

a plurality of bus-bars; and
a bus-bar holder that supports the bus-bars; wherein
each of the bus-bars includes a first bus-bar piece and a second bus-bar piece;
the first bus-bar piece includes:
a coil wire connection portion connected to a coil wire drawn from the stator; and
a first joint terminal joined to the second bus-bar piece;
the second bus-bar piece includes:
an external connection terminal connected to an external apparatus; and
a second joint terminal joined to the first bus-bar piece;
at least a portion of the first bus-bar pieces is embedded in the bus-bar holder;
the first joint terminal includes a joint surface that faces and is joined to the second joint terminal, and an opposite surface facing a side opposite to the joint surface; and
the joint surface and the opposite surface of the first joint terminal are exposed from the bus-bar holder.

2. The bus-bar unit according to claim 1, wherein
the first joint terminal includes an outer peripheral surface that connects the joint surface and the opposite surface; and
the outer peripheral surface is embedded in the bus-bar holder.

3. The bus-bar unit according to claim 2, wherein an entire periphery of the first joint terminal is surrounded in the bus-bar holder when viewed in a direction orthogonal to the joint surface.

4. The bus-bar unit according to claim 1, wherein the external connection terminal extends upwardly with respect to the bus-bar holder and the bus-bar holder includes a terminal holder that holds the external connection terminal.

5. The bus-bar unit according to claim 1, wherein
the first bus-bar piece includes a first piece main body that connects the coil wire connection portion and the first joint terminal; and
the first piece main body of at least some of the plurality of bus-bars overlaps with the external connection terminal when viewed in an axial direction.

6. The bus-bar unit according to claim 1, wherein the first bus-bar piece and the second bus-bar piece are made of materials different from each other.

7. The bus-bar unit according to claim 1, wherein the joint surface faces upwardly.

8. The bus-bar unit according to claim 1, wherein the first joint terminal and the second joint terminal are weld-joined with each other.

9. The bus-bar unit according to claim 1, wherein the first joint terminal and the second joint terminal are press-joined with each other.

10. A motor comprising:
a stator;
a rotor facing the stator via a gap in a radial direction; and
a bus-bar unit on an upper side of the stator disposed annularly or substantially annularly around a central axis extending in an up-down direction, the bus-bar unit comprising:
a plurality of bus-bars; and
a bus-bar holder that supports the bus-bars; wherein
each of the bus-bars includes a first bus-bar piece and a second bus-bar piece;
the first bus-bar piece includes:
a coil wire connection portion connected to a coil wire drawn from the stator; and
a first joint terminal joined to the second bus-bar piece;

the second bus-bar piece includes:
- an external connection terminal connected to an external apparatus; and
- a second joint terminal joined to the first bus-bar piece;

at least a portion of the first bus-bar pieces is embedded in the bus-bar holder;

the first joint terminal includes a joint surface that faces and is joined to the second joint terminal, and an opposite surface facing a side opposite to the joint surface; and the joint surface and the opposite surface of the first joint terminal are exposed from the bus-bar holder.

\* \* \* \* \*